United States Patent
Zhao et al.

(10) Patent No.: US 11,861,478 B2
(45) Date of Patent: *Jan. 2, 2024

(54) MACHINE LEARNING MODEL TRAINING METHOD AND APPARATUS, SERVER, AND STORAGE MEDIUM

(71) Applicant: TENCENT TECHNOLOGY (SHENZHEN) COMPANY LIMITED, Shenzhen (CN)

(72) Inventors: Wei Zhao, Shenzhen (CN); Yabing Feng, Shenzhen (CN); Yu Liao, Shenzhen (CN); Junbin Lai, Shenzhen (CN); Haixia Chai, Shenzhen (CN); Xuanliang Pan, Shenzhen (CN); Lichun Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,858

(22) Filed: Oct. 4, 2022

(65) Prior Publication Data

US 2023/0031156 A1 Feb. 2, 2023

Related U.S. Application Data

(63) Continuation of application No. 16/383,140, filed on Apr. 12, 2019, now Pat. No. 11,531,841, which is a
(Continued)

(30) Foreign Application Priority Data

Oct. 31, 2016 (CN) .......................... 201610979377.5

(51) Int. Cl.
*G06N 20/00* (2019.01)
*G06F 18/25* (2023.01)
(Continued)

(52) U.S. Cl.
CPC ............ *G06N 20/20* (2019.01); *G06F 18/217* (2023.01); *G06F 18/2148* (2023.01); *G06F 18/254* (2023.01); *G06N 20/00* (2019.01)

(58) Field of Classification Search
CPC ........ G06N 20/20; G06N 20/00; G06N 20/10; G06F 18/2148; G06F 18/217;
(Continued)

(56) References Cited

U.S. PATENT DOCUMENTS 8,909,564 B1 12/2014 Kaplow et al.
9,053,391 B2 6/2015 Wang et al.
(Continued)

FOREIGN PATENT DOCUMENTS

CN 101571998 A 11/2009
CN 102637143 A 8/2012
(Continued)

OTHER PUBLICATIONS

The World Intellectual Property Organization (WIPO) International Search Report for PCT/CN2017/108438 dated Jan. 31, 2018 6 Pages (including translation).
(Continued)

*Primary Examiner* — Sheela C Chawan
(74) *Attorney, Agent, or Firm* — ANOVALAW GROUP PLLC

(57) ABSTRACT

A machine learning model training method includes: training a machine learning model using features of samples in a training set, where a sample in the training set corresponds to an initial first weight and an initial second weight. In one iteration, the method includes: determining a first sample set comprising one or more samples whose corresponding target variables are incorrectly predicted; determining an overall predicted loss of the first sample set based on the predicted losses and corresponding first weights of samples in the first
(Continued)

sample set; updating the first weights and second weights of the samples in the first sample set based on the overall predicted loss of the first sample set; and inputting the second weights, the features, and the target variables of the samples in the training set to the machine learning model, and initiating a next iteration of training the machine learning model.

20 Claims, 6 Drawing Sheets

Related U.S. Application Data continuation of application No. PCT/CN2017/108438, filed on Oct. 30, 2017.

(51) Int. Cl.
*G06N 20/20* (2019.01)
*G06F 18/214* (2023.01)
*G06F 18/21* (2023.01)

(58) Field of Classification Search
CPC ............... G06F 18/254; G06F 18/214; G06F 18/24323; G06F 18/231; G06Q 10/0639
USPC ............................................ 706/12; 382/100
See application file for complete search history.

(56) References Cited

U.S. PATENT DOCUMENTS

| | | |
|---|---|---|
| 9,141,622 B1 | 9/2015 | Moore |
| 11,200,514 B1 | 12/2021 | Chen et al. |
| 11,531,841 B2 * | 12/2022 | Zhao ................... G06F 18/214 |
| 2013/0132315 A1 | 5/2013 | Principe et al. |
| 2015/0094983 A1 | 4/2015 | Wang et al. |

FOREIGN PATENT DOCUMENTS

| | | |
|---|---|---|
| CN | 104346221 A | 2/2015 |
| CN | 104573013 A | 4/2015 |
| CN | 105320957 A | 2/2016 |
| CN | 105844300 A | 8/2016 |
| CN | 106548210 A | 3/2017 |
| EP | 2164025 A1 | 3/2010 |

OTHER PUBLICATIONS

Jiri Matas et al., "AdaBoost", http://www.robots.ox.ac.uk/~az/lectures/cv/adaboost_matas.pdf. 136 Pages.
The State Intellectual Property Office of the People's Republic of China (SIPO) Office Action 1 for 201610979377.5, dated Sep. 3, 2019 10 Pages (including translation).
Dong-Sheng Cao et al.; "The boosting: A new idea of building models", Chemometrics and Intelligent Laboratory Systems, vol. 100 No. 1, Jan. 31, 2010 (Jan. 31, 2010), p. 1-11 11 Pages.

* cited by examiner

MACHINE LEARNING MODEL TRAINING METHOD AND APPARATUS, SERVER, AND STORAGE MEDIUM

CROSS REFERENCES TO RELATED APPLICATIONS

This application is a continuation application of U.S. application Ser. No. 16/383,140 filed on Apr. 12, 2019; U.S. application Ser. No. 16/383,140 is a continuation application of PCT Patent Application No. PCT/CN2017/108438, filed on Oct. 30, 2017, which claims priority to Chinese Patent Application No. 201610979377.5 filed on Oct. 31, 2016, the entire contents of all of which are incorporated herein by reference.

FIELD OF TECHNOLOGY

The present disclosure relates to computer technologies, and in particular, to a machine learning model training method and apparatus, a server, and a storage medium.

BACKGROUND OF THE DISCLOSURE

Machine Learning (ML) is a technology involving multiple fields, and is constantly applied in actual industry fields.

A supervised manner is a currently used solution of training a machine learning model. A machine learning model is trained based on features (for example, title content of a mail and credit reporting data of a user) of samples in a training set and a classification result (also referred to as a target variable, for example, a credit grade of a user), so that the machine learning model has performance of predicting a classification result of samples.

For example, by using a machine learning model, high-quality customers and non-high-quality customers are distinguished in a credit reporting service, spam mails and normal mails are distinguished in a mail system, and whether a customer is a potential customer to be lost in business is distinguished.

If training a machine learning model includes training multiple classifiers based on a supervised manner, there is a problem that a classification result of some samples in a training set is difficult to predict.

SUMMARY

Embodiments of the present disclosure provide a machine learning model training method and apparatus, a server, and a storage medium, which can improve at least machine learning model prediction precision and training efficiency.

Technical solutions of the embodiments of the present disclosure are implemented as follows:

According to one aspect, an embodiment of the present disclosure provides a machine learning model training method executed by a computing device. The method includes training a machine learning model using features of samples in a training set, where a sample in the training set corresponds to an initial first weight and an initial second weight. In one iteration, the method includes determining a first sample set comprising one or more samples whose corresponding target variables are incorrectly predicted based on predicted losses of the samples in the training set; determining an overall predicted loss of the first sample set based on the predicted losses and corresponding first weights of the one or more samples in the first sample set; updating the first weights and second weights of the one or more samples in the first sample set based on the overall predicted loss of the first sample set; and inputting the second weights, the features, and the target variables of the samples in the training set to the machine learning model, and initiating a next iteration of training the machine learning model.

According to another aspect, an embodiment of the present disclosure provides a machine learning model training apparatus, including: a memory and one or more processors. The one or more processors are configured to train a machine learning model using features of samples in a training set where a sample in the training set corresponds to an initial first weight and an initial second weight. In one iteration of training the machine learning model, the one or more processors are configured to determine a first sample set comprising one or more samples whose corresponding target variables are incorrectly predicted based on predicted losses of the samples in the training set. The one or more processors are also configured to determine an overall predicted loss of the first sample set based on the predicted losses and corresponding first weights of the one or more samples in the first sample set. The one or more processors are also configured to update the first weights and second weights of the one or more samples in the first sample set based on the overall predicted loss of the first sample set. The one or more processors are also configured to input the second weights, the features, and the target variables of the samples in the training set to the machine learning mode, and initiate a next iteration of training the machine learning model.

According to another aspect, an embodiment of the present disclosure provides a non-transitory storage medium, storing an executable program. When being executed by a processor, the executable program can cause the processor to perform: training a machine learning model using features of samples in a training set where a sample in the training set corresponds to an initial first weight and an initial second weight. In one iteration of training the machine learning model, the executable program causes the processor to perform: determining a first sample set comprising one or more samples whose corresponding target variables are incorrectly predicted based on predicted losses of the samples in the training set. The executable program also causes the processor to perform: determining an overall predicted loss of the first sample set based on the predicted losses and corresponding first weights of the one or more samples in the first sample set. The executable program also causes the processor to perform: updating the first weights and second weights of the one or more samples in the first sample set based on the overall predicted loss of the first sample set. The executable program also causes the processor to perform: inputting the second weights, the features, and the target variables of the samples in the training set to the machine learning mode, and initiating a next iteration of training the machine learning model.

The embodiments of the present disclosure have the following beneficial effects:

First, the machine learning model is trained when samples are distributed based on the second weight, a sample (the first sample set) that is incorrectly predicted by the machine learning model is found, and a corresponding weight is increased to update distribution of samples. In this way, in subsequent training, a classifier in the machine learning model pays more attention to the sample that is incorrectly predicted, and prediction precision of the incorrect sample is improved.

Second, the machine learning model is trained at the granularity of the feature, a training process can be quickly completed by a multithreaded processor, and training efficiency of the machine learning model is improved.

DESCRIPTION OF EMBODIMENTS

Figure 1:
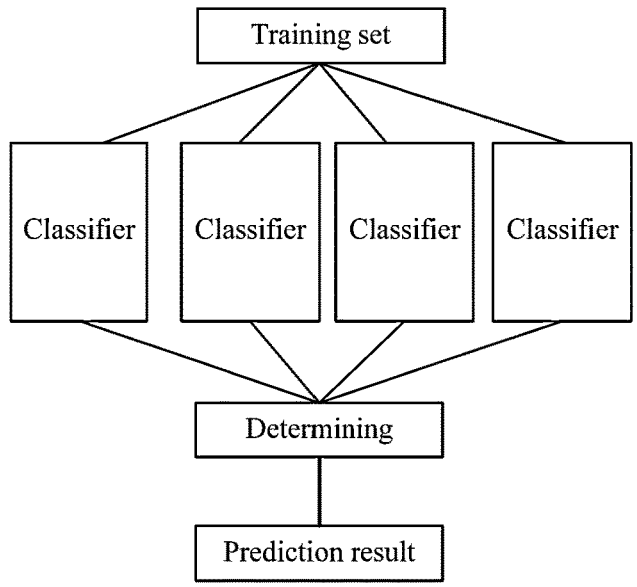
FIG. 1 is an optional schematic structural diagram of a machine learning model according to an embodiment of the present disclosure.

The present disclosure is described below in further detail with reference to accompanying drawings and embodiments. It should be understood that embodiments described herein are merely used for explaining the present disclosure, instead of limiting the present disclosure. In addition, embodiments provided below are used to implement some embodiments of the present disclosure, instead of providing all embodiments for implementing the present disclosure, and the technical solutions described in the embodiments of the present disclosure may be implemented in any combined manner if there is no conflict.

Before the present disclosure is described in further detail, nouns and terms involved in the embodiments of the present disclosure are described, and nouns and terms involved in the embodiments of the present disclosure are explained as follows:

1) Machine Learning (ML): a process of analyzing a sample in a training set to obtain a machine learning model (also briefly referred to as a parameter below) that can predict a target variable of a sample.

2) Supervised learning: a parameter of a model is adjusted based on a feature and a target variable of a sample in a training set, so that the model has performance of predicting the target variable based on the feature of the sample. The target variable may be qualitative (for example, a class) or may be quantitative (for example, consecutive values).

3) Training set: a set of samples (also referred to as training samples) used to train a machine learning model in a supervised manner.

A sample in a training set includes a feature (for example, features in multiple dimensions) and a target variable having a definite value of the sample, so that a machine learning model can find a law of predicting the target variable based on the feature of the sample, and therefore has performance of predicting a value of the target variable based on the feature of the sample.

4) Gradient boosting (GB) method: also referred to as a gradient boosting decision tree (GBDT) method, that is, a method for performing iterative training by linearly combining multiple weak classifiers (a function whose classification performance is insufficient to independently classify samples) to form a strong classifier (a function whose classification performance is sufficient to independently classify samples), where according to a gradient direction of a loss function of a model obtained after each iterative training, the model is updated in a manner of adding a function to the trained model, so that after each iterative training, a predicted loss of the model can decrease along the gradient direction.

5) Extreme gradient boosting (XGBoost) method: a C++ implementation of the gradient boosting decision tree method, where multiple threads of processors such as a graphics processing unit (GPU) and a central processing unit (CPU) train a model in parallel, and an algorithm is improved, to improve precision.

6) Overfitting: to enable a model to precisely predict all samples, the model becomes excessively complex.

7) Loss function (Loss Function): which is used to indicate an inconsistency degree between a predicted result of a target variable in a machine learning model and an actual result of the target variable, and is a non-negative real-valued function, where a less loss function indicates better robustness of the machine learning model.

The loss function includes representation forms such as a logistic loss (Logistic Loss) function, a quadratic loss function, and an exponential loss function.

8) Compensation function: evaluation of a residual formed after each iteration process of a machine learning model, where a residual is a difference between a predicted value and an actual value of a target variable of a sample in the machine learning model.

9) Target function: used to restrict a process of training a model to obtain an ideal parameter. For example, the target function may be in a form of a sum of the loss function and the compensation function.

10) Gradient Descent (GD): a method for solving a maximum value of a loss function along a gradient descent direction, including mini-batch gradient descent (MBGD), batch gradient descent (BGD), stochastic gradient descent (SGD), and the like.

11) First sample set: a set of samples that are in the training set and whose target variables are incorrectly predicted.

12) Second sample set: a set of samples that are in the training set and whose target variables are correctly predicted.

In a process of training, based on a supervised manner, the machine learning model, for example, an extreme gradient boosting (XGBoost) model including multiple classifiers, there is a problem that it is always difficult to predict classification of some samples in the training set. For example, when a machine learning model used to classify high-quality customers and non-high-quality customers is trained, for samples whose classification correctness percentages are 50% or a neighborhood (for example, 48% to 52%), the machine learning model classifies the samples to high-quality customers and non-high-quality customers randomly. In other words, it is equivalent to that the samples are not classified. Because of randomness of a classification result, after the machine learning model is iteratively trained each time, a predicted result of a sample is unstable.

Another example is used for description. FIG. 1 is an optional schematic structural diagram of a machine learning model according to an embodiment of the present disclosure. The machine learning model includes multiple classifiers. FIG. 1 exemplarily shows that a classifier trains the machine learning model in a supervised manner by using linear combination. It is equivalent to that the multiple classifiers (certainly, a machine learning model including two classifiers is not excluded) included in the machine learning model perform training.

For example, a decision tree classifier such as a classification and regression tree (CART), a neural network, or a support vector machine (SVM) may be used as the classifier. Certainly, other types of classifiers are not excluded in this embodiment of the present disclosure.

For example, the classifier uses an XGBoost model. In the solution of training the XGBoost model provided in this embodiment of the present disclosure, when a feature and a target variable of a sample in a training set are inputted to the XGBoost model, if weights of samples are consistent, a predicted result of the target variable of the sample in the XGBoost model is random and is unstable.

For example, when the machine learning model is used to determine whether a user is a high-quality customer, it is difficult to classify samples because of various reasons (for example, because features of the samples are insufficient, or the samples are sparsely distributed). In this case, a probability of classifying the user to a high-quality customer or a non-high-quality customer is 50% or a neighborhood of 50%. This is equivalent to that whether the user is a high-quality customer is not classified. Consequently, prediction precision of the machine learning model cannot be ensured.

To resolve at least the foregoing problems, an embodiment of the present disclosure provides a machine learning model training method. When a machine learning model including multiple classifiers is trained, two weights are maintained for samples in a training set, where the weights includes a first weight and a second weight. The first weight and the second weight of each sample are initial. After the machine learning model is iteratively trained based on the initial second weight, a predicted loss is determined based on the first weight of each sample. A set of samples (that is, the first sample set) whose target variables are incorrectly predicted and a set of samples (that is, the second sample set) whose target variables are correctly predicted are determined based on the predicted loss of each sample in the training set. A weight of each sample in the first sample set and the second sample set is updated. After update, the first weight of each sample in the first sample set is greater than the second weight of the sample in the second sample set, and the second weight of each sample in the first sample set is greater than the second weight of the sample in the second sample set. The machine learning model is trained based on the updated second weight of the sample with reference to a feature and the target variable of the sample.

In this embodiment of the present disclosure, a weight of a sample that is incorrectly predicted is increased by using two weights, so that when the machine learning model is trained, more attention may be paid to the sample whose target variable is incorrectly predicted, the problem that a predicted result of a target variable of a sample is random is resolved, and prediction precision of the machine learning model is improved.

Figure 2:
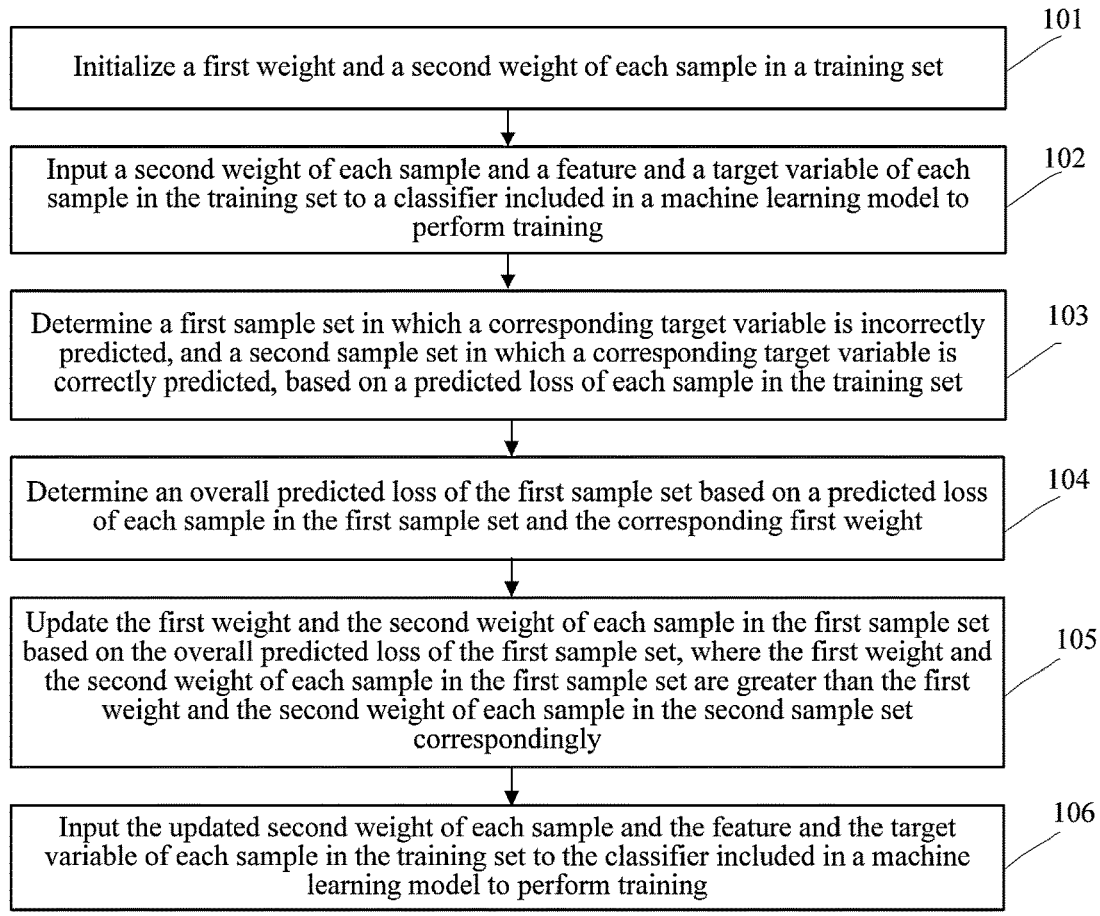
FIG. 2 is an optional schematic flowchart of a machine learning model training method according to an embodiment of the present disclosure.

The machine learning model training method is exemplarily described with reference to FIG. 2. FIG. 2 is an optional schematic flowchart of a machine learning model training method according to an embodiment of the present disclosure. The method includes step 101 to step 106.

Step 101. Initialize a first weight (marked as $w_1$) and a second weight (marked as $w\_xgb_1$) of each sample in a training set.

In an optional embodiment of the present disclosure, a sample in the training set includes a feature and a target variable, the feature includes multi-dimensional data of the sample, and the target variable is used to describe the sample in a qualitative or quantitative manner.

A credit reporting service scenario is used as an example. The machine learning model may be used to predict whether a user is a high-quality customer, and the target variable may be used to indicate that the user is a high-quality customer or a non-high-quality customer. For example, a possibility degree at which the user is a high-quality customer may be indicated in a form of a grade or a confidence level. When a predicted grade or confidence level exceeds a threshold, it indicates that the user is a high-quality customer. The feature may include data of the user such as an income and an expenditure.

A customer maintenance service scenario is used as an example. The machine learning model may be used to predict whether a user is a potential to-be-lost customer of a client, and the target variable may be used to indicate that the user is a potential to-be-lost customer or is not a potential to-be-lost customer. Similarly, a possibility degree at which the user is a potential to-be-lost customer may be indicated in a form of a grade or a confidence level. When a predicted grade or confidence level exceeds a threshold, it indicates that the user is a potential to-be-lost customer. The feature may include basic attributes (for example, a gender, a region, and a preference) of the user, a client login state (a frequency and a time), and a message sending state on the client (a usage frequency and the like).

In an embodiment, the prior first weight and the prior second weight are uniformly allocated to each sample in the training set, initial first weights $w_1$ of samples are the same, and initial second weights $w\_xgb$ of samples are also the same.

For values of the prior first weight and the prior second weight, the first weight may be uniformly allocated to each sample in the training set, and the second weight may be uniformly allocated to each sample in the training set based on a quantity of samples in the training set, and a value of the second weight is different from that of the first weight.

For example, assuming that the training set includes M samples, the first weight allocated to each sample in the training set is shown in formula (1):

$$w_1 = 1/M \qquad (1).$$

A weight value of the second weight of each sample in the training set may be different from a weight value of the first weight. For example, a weight value of the second weight allocated to each sample in the training set may be 1.

Step 102. Input a second weight of each sample and a feature and a target variable of each sample in the training set to a classifier included in a machine learning model to perform training.

Figure 3:
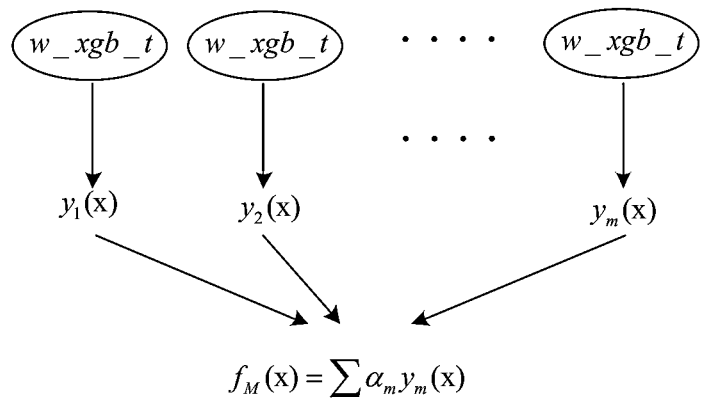
FIG. 3 is an optional schematic structural diagram of a machine learning model according to an embodiment of the present disclosure.

In an embodiment, the machine learning model may be iteratively trained for multiple times based on the sample and the corresponding second weight of the sample. Referring to FIG. 3, the machine learning model includes multiple classifiers. The multiple classifiers are base classifiers relative to the machine learning model, that is, basic determining units, and are marked as $y_1(x)$ to $y_m(x)$. In this case, in an $s^{th}$ (s is an integer greater than or equal to 1) iterative training, the following operations are performed: the sample in the training set and the second weight $w\_xgb_1$ of the sample are inputted to each classifier, a minimum weighted error function (WEF) of each classifier is solved to obtain a fusion coefficient $\alpha_m$ of the classifier, and the classifiers are combined based on the fusion coefficient of each classifier, to obtain the machine learning model after the $s^{th}$ iterative training. The model is shown in formula (2) and marked as:

$$f_M(x) = \Sigma \alpha_m y_m(x) \qquad (2).$$

In an embodiment, because each classifier predicts a value of the target variable of the sample, a final predicted result outputted by the machine learning model is obtained by comprehensively performing determining based on a predicted result of each classifier. A confidence level of the predicted result of each classifier depends on a fusion coefficient of the classifier. Therefore, at a stage of training the machine learning model, to avoid a problem that the obtained fusion coefficient is not an optimal solution of the minimum weight error function, by minimizing a quadratic sum of predicted losses of samples in the first sample set, the fusion coefficient of the classifier included in the machine learning model is solved so that the quadratic sum is minimum. Combination is performed to form the trained machine learning model based on solved fusion coefficients of classifiers. The classifiers are combined based on the fusion coefficients, thereby ensuring precision of the machine learning model.

The following describes a training process of the machine learning model by using an example in which the classifier used in the machine learning model is an XGBoost model based classifier. It should be noted that if the machine learning model is trained by using another type of classifier, a person skilled in the art may easily perform implementation based on understanding of the following without creative work.

In the XGBoost method, training is performed in a supervised manner, and relates to three parts: an XGBoost model, a parameter, and a target function. The XGBoost model and the parameter are used to control how to predict the value of the target variable (including a classification result or a fitting value) based on the sample. The target function is used to restrict a process of training the model to obtain an ideal parameter. A less target function indicates higher prediction precision of the XGBoost model. A process of training the XGBoost model is a process of enabling a value of the target function to be less than a particular value or to converge to a particular degree.

The XGBoost model includes a classification and regression tree (CART) function (classification regression tree for short below). A classification tree and a regression tree are collectively referred to as the classification regression tree. When a classification problem is resolved, for example, whether a user is a credible user or an incredible user (that is, a binary classification problem) is predicted, the classification tree is used. For another example, when a regression problem is resolved, for example, a credit grade of a user is predicted, the regression tree is used.

Figure 4:
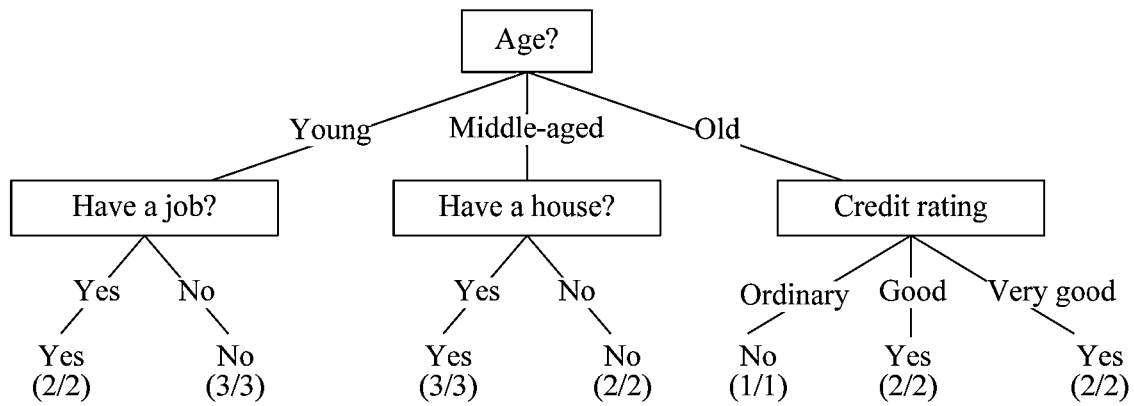
FIG. 4 is an optional schematic structural diagram of a classification tree according to an embodiment of the present disclosure.

FIG. 4 is an optional schematic structural diagram of a classification tree. Each node in the classification tree indicates an attribute of a sample, each branch path indicates a possible value of an attribute, and each leaf node corresponds to a value (a class) of a sample indicated by a path from a root node to a leaf node.

When the classification regression tree is used in the XGBoost model, because prediction (predict the value of the target variable of the sample) cannot be effectively performed because the classification regression tree is excessively simple. Therefore, a tree ensemble (TE) is used in the XGBoost model. The tree ensemble may be considered as a linear combination of a series of classification and regression trees, and an optional example may be marked as the following formula (3):

$$\hat{y}_i = \sum_{k=1}^{k} f_k(x_i), f_k \in F. \qquad (4)$$

$f_k$ is a classification and regression tree in F, F is a classification and regression tree set, and the target function of the XGBoost model is shown in the following formula (4):

$$Obj(\theta) = \sum_{i=1}^{n} l(y_i, \hat{y}_i) + \sum_{k=1}^{k} \Omega(f_k). \qquad (5)$$

$x_i$ indicates a feature of an $i^{th}$ sample.

$$\sum_{i=1}^{n} l(y_i, \hat{y}_i)$$

is a loss function, indicates a degree of a difference between a predicted value and an actual value of a target variable of a sample in the XGBoost model, and may be in a form of, for example, a quadratic loss function or an exponential loss function.

$$\sum_{k=1}^{k} \Omega(f_k)$$

indicates a residual between a predicted value and an actual value of a target variable that is caused because of randomness of a sample, and is also referred to as a regularization term. The residual may be in a form of a sum of complexities of classification and regression trees in the classification and regression tree set. The regularization term is related to a quantity of leaf nodes and a value of the leaf node in the classification and regression tree.

Because a parameter of the XGBoost model needs to be solved in F, and the XGBoost model cannot be trained by using a traditional method such as stochastic gradient descent, in this embodiment of the present disclosure, a gradient boosting method is used.

For example, a new compensation functions superimposed on the XGBoost model obtained after each iterative training, to compensate for a residual of the XGBoost model caused in a previous iterative training process, and a new model continues to be trained to minimize the target function. Expressions of the first to the $t^{th}$ iterative training are described with reference to the XGBoost model:

Before the first iterative training, the XGBoost model is indicated as the following formula (6):

$$\hat{y}_i^{(0)}=0 \tag{6}$$

After the first iterative training, the iterative XGBoost model is indicated as the following formula (7):

$$\hat{y}_i^{(1)}=f_1(x_i)=\hat{y}_i^{(0)}+f_1(x_i) \tag{7}$$

After the second iterative training, the XGBoost model is indicated as the following formula (8):

$$\hat{y}_i^{(2)} = \sum_{k=1}^{t} f_k(x_i) = \hat{y}_i^{(1)} + f_2(x_i). \tag{8}$$

By analogy, after the $t^{th}$ iterative training, the XGBoost model is indicated as the following formula (9):

$$\hat{y}_i^{(t)} = \sum_{k=1}^{t} f_k(x_i) = \hat{y}_i^{(t-1)} + f_t(x_i). \tag{9}$$

With reference to the foregoing formula, in the first iterative training, the compensation function $f_1(x_i)$ is superimposed on the initial model $\hat{y}_i^{(0)}$, and the new model $\hat{y}_i^{(1)}$ obtained after compensation is iteratively trained for the second time. In the second iterative training, the compensation function $f_2(x_i)$ is superimposed on the model $\hat{y}_i^{(1)}$ obtained after the first iterative training, and a new model $\hat{y}_i^{(2)}$ obtained after compensation is trained. In the $t^{th}$ iterative training, a compensation function $f_t(x_i)$ is superimposed on a model $\hat{y}_i^{(t-1)}$ obtained after the $(t-1)^{th}$ iterative training, and a new model $\hat{y}_i^{(t)}$ obtained after compensation is trained.

Therefore, after the $t^{th}$ iterative training, the target function $O_{bj}^{(t)}$ may be indicated by the following formula (10):

$$O_{bj}^{(t)} = \sum_{i=1}^{n} l(y_i, \hat{y}_i^{(t)}) + \sum_{i=1}^{t} \Omega(f_i) \tag{10}$$

$$= \sum_{i=1}^{n} l(y_i, y_i^{(t-1)} + f_t(x_i)) + \Omega(f_t) + \text{constant}.$$

constant is a constant. In the gradient boosting method, the function (the compensation function) $f_t(x_i)$ added to the currently trained model to construct a new model is selected by using the following rule: the function $f_t(x_i)$ is selected so that the target function is minimized. This is equivalent to minimize the following formula (11):

$$\sum_{i=1}^{n} l(y_i, y_i^{(t-1)} + f_t(x_i)). \tag{11}$$

Cases in which l are different forms of loss functions are described:

1) when l is a quadratic loss function, the target function may be indicated as formula (12):

$$O_{bj}^{(t)} = \sum_{i=1}^{n} [2(y_i^{(t-1)} - y_i f_t(x_i) + f_t^2(x_i))] + \Omega(f_t) + \text{constant}. \tag{12}$$

Herein, $2(y_i^{(t-1)}-y_i f_t(x_i)$ is also referred to as a residual.

2) when l is another form of loss function:
quadratic expansion is performed on the target $$\sum_{i=1}^{n} l(y_i, y_i^{(t-1)} + f_t(x_i))$$

by using a Taylor formula, to obtain formula (12):

$$O_{bj}^{(t)} \approx \sum_{i=1}^{n} [l(y_i, y_i^{(t-1)} + g_i f_t(x_i) + 1/2 h_i f_t^2(x_i))] + \Omega(f_t) + \text{constant}, \tag{12}$$

where $$g_i = \partial_{\hat{y}^{(t-1)}} l(y_i, \hat{y}_i^{(t-1)}), h_i = \partial^2_{\hat{y}^{(t-1)}} l(y_i, \hat{y}_i^{(t-1)}).$$

A uniform target function may be obtained, and is shown in formula (13):

$$\sum_{i=1}^{n} [g_i f_t(x_i) + 1/2 h_i f_t^2(x_i)] + \Omega(f_t). \tag{13}$$

It is not difficult to see that after a constant term is removed, the target function has a very obvious feature: the compensation function added to the model after each iterative training is determined based on the first derivative and the second derivative in the loss function.

In the XGBoost method, quadratic Taylor expansion is performed on the target function, and the function added to the model after each iteration is determined by using the first derivative and the second derivative. It is supported that the target function is self-defined, and a regularization term is added to the target function, to control model complexity, so that the trained XGBoost based classifier is simpler, and an overfitting phenomenon is avoided in a training process.

Besides, in the XGBoost method, multi-threaded training is performed in parallel at the granularity of the features of the sample, thereby obviously reducing time complexity required in model training. For example, samples in the training set are classified based on features, one or more threads of a processor are allocated to each type of sample, and each thread trains the machine learning model by using samples having a same feature. The parallel multi-thread manner obviously improves machine learning model training efficiency.

Step 103. Determine a first sample set (marked as gt) in which a corresponding target variable is incorrectly predicted (i.e., sample(s) in the first sample set are the ones incorrectly predicted its corresponding target variable), and a second sample set (marked as le) in which a corresponding target variable is correctly predicted (i.e., sample(s) in the second sample set are the ones correctly predicted its corresponding target variable), based on a predicted loss of each sample in the training set.

In an embodiment, the predicted loss of each sample in the training set is determined based on the loss function of the machine learning model.

For example, the predicted loss of each sample is determined in the following manner: Based on a difference $\hat{y}-y$ between a predicted value $\hat{y}$ and an actual value y $\hat{y}-y$ of each sample in the machine learning model, it is determined that an output value of a loss function $f(\hat{y}-y)$ that uses the difference $\hat{y}-y$ as a dependent variable is a predicted loss loss of a corresponding sample. $f(\hat{y}-y)$ may be a function in any form, including an exponent form, a logarithm form, and the like. An exponent form shown in formula (14) may be used:

$$\text{loss}=\log[1+\text{abs}(\hat{y}-y/y)] \quad (14), \text{where}$$

abs is an absolute value operator.

In an embodiment, the first sample set and the second sample set are determined by using a result of comparing the predicted loss of the sample with a loss threshold phi Samples in the training set whose predicted losses exceed the loss threshold form the first sample set gt, and samples whose predicted losses do not exceed the loss threshold form the second sample set le.

Step 104. Determine an overall predicted loss of the first sample set gt based on a predicted loss of each sample in the first sample set and the corresponding first weight.

A loss of each sample in the first sample set is determined based on the loss function. A sum of losses is marked as $$\sum_{gt} \text{loss}.$$

The overall predicted loss is an overall predicted loss $\xi_1$ of the first sample set that is obtained by performing adjustment such as multiplication operation adjustment on a sum of predicted losses of samples by using the first weight, as shown in formula (15):

$$\xi_1 = w_1 \sum_{gt} \text{loss}. \quad (15)$$

In some embodiments, because the loss function is indicated by parameters distributed within a value range of 0 to 1, the initial first weight $w_1$ is a value having a negative correlation with a quantity of samples in the training set, for example, $w_1=1/m$. Therefore, a value of the overall predicted loss of the first sample set is less than 1. In some embodiments, the loss function of each sample is indicated by parameters distributed within a value range of 0 to 1; the first weight of each sample is regularized at the end of each iteration (e.g., to ensure all first weights adds up to 1) and is also a value between 0 and 1. Thus, a value of the predicted loss of each sample in the first sample set is less than 1.

Step 105. Update the first weight and the second weight of each sample in the first sample set based on the overall predicted loss of the first sample set, where the first weight and the second weight of each sample in the first sample set are greater than the first weight and the second weight of each sample in the second sample set correspondingly.

That is, the first weight of each sample in the first sample set is greater than the first weight of each sample in the second sample set, and the second weight of each sample in the first sample set is greater than the second weight of each sample in the second sample set.

The weight update factor $\beta_1$ less than 1 is constructed by using the overall predicted loss of the first sample set. It may be understood that the weight update factor $\beta_1$ may be constructed by using a form such as $\beta_1=\xi_1^2$ or $\beta_1=\xi_1$.

Exemplarily, the first weight of each sample in the first sample set is increased in this manner based on the weight update factor:

1) The updated first weight w_le_phi$_2$ of each sample in the second sample set le is obtained by decreasing the original first weight $w_1$ by using the weight update factor $\beta_1$. That is, a product of the weight update factor and the original first weight $w^1$ is used as the updated first weight, as shown in formula (16) marked as follows:

$$w\_le\_\text{phi}_2=\beta_1*w_1 \quad (16).$$

Besides, the first weight of each sample in the first sample set gt keeps unchanged before and after update, and is consistent with a value of the first weight existing when the machine learning model is iteratively trained for the first time. The updated first weight w_gt_phi$_2$ is shown in formula (17) marked as follows:

$$w\_gt\_\text{phi}_2=w_1=1/M \quad (17).$$

Because the updated first weight w_le_phi$_2$ of each sample in the second sample set le is obtained by decreasing the original first weight using the weight update factor $\beta_1$, although a value of the first weight w_gt_phi$_2$ of each sample in the first sample set gt is not directly increased, a weight value is increased compared with the first weight w_le_phi$_2$ of each sample in the second sample set le.

It should be noted that to ensure that the value of the first weight is not excessively small in subsequent iterative training (for example, the third iterative training or the fourth iterative training), normalization processing may be performed by using a maximum value of the first weight w_gt_phi$_2$ w_le_phi$_2$ as reference.

Besides, the first weight of each sample in the first sample set is decreased in this manner based on the weight update factor:

2) The updated second weight gt of each sample in the second sample set w_xgb_gt_phi$_2$ is obtained by increasing the original second weight w_xgb by using the weight update factor $\beta_1$. That is, a quotient of the original second weight $w_1$ and the weight update factor is used as the updated second weight w_gt_phi$_2$, as shown in formula (18) marked as follows:

$$w\_xgb\_gt\_\text{phi}_2=w\_xgb*(1/\beta_1) \quad (18)$$

Besides, the second weight of each sample in the second sample set le keeps unchanged before and after update, and is consistent with a value of the second weight existing when the machine learning model is iteratively trained for the first time. The updated second weight w_xgb_le_phi$_2$ is shown in formula (17) marked as follows:

$$w\_xgb\_le\_\text{phi}_2=w\_xgb \quad (19).$$

Because the second weight of each sample in the first sample set gt is increased by using the weight update factor $\beta_1$, the second weight of each sample in the second sample set le keeps unchanged before and after update, and a weight value of the second weight of each sample in the first sample set gt is increased.

Step 106. Input the updated second weight of each sample and the feature and the target variable of each sample in the training set to the classifier included in a machine learning model to perform training.

It may be understood that based on the sample and the updated corresponding second weight of the sample, the machine learning model may be iteratively trained for multiple times. Still referring to FIG. 2, the machine learning model includes the multiple classifiers $y_1(x)$ to $y_m(x)$. In the $s^{th}$ (s is an integer greater than or equal to 1) iterative training, the following operations are performed:

inputting the first sample set and the second weight w_xgb_gt_phi$_2$ of the first sample set, and the second sample set and the second weight w_xgb_le_phi$_2$ of the second sample set to each classifier, solving a fusion coefficient $\alpha_m$ of the classifier by minimizing a weight error function of the classifier; and combining classifiers based on fusion coefficients of the classifiers, to finally obtain, by training, the new machine learning model shown in formula (2).

In the iterative training process, it should be noted that a difference between the $(s+1)^{th}$ training process and the $s^{th}$ training process is that a to-be-trained machine learning model in the $(s+1)^{th}$ training and the machine learning model obtained after the $s^{th}$ training has the following relationship: the machine learning model obtained after the $(s+1)^{th}$ training=the machine learning model obtained after the $s^{th}$ training+the compensation function.

Therefore, exemplarily, if the compensation function is constructed by using a second-order derivation result of the loss function of the machine learning model obtained after the $s^{th}$ training, a prediction error of the machine learning model obtained after the $s^{th}$ training may converge along a gradient direction of the loss function, so that the prediction error of the machine learning model is minimized, and prediction precision is improved.

Besides, because the value of the second weight in the first sample set is increased, compared with a same weight of the sample that is inputted to the machine learning model, in a process of training the machine learning model, more attention is paid to calculation of a fusion coefficient for the sample in the first sample set, so that the trained machine learning model has better performance of predicting a value of a target parameter in the first sample set.

In an optional embodiment of the present disclosure, when the machine learning model uses an XGBoost model as a classifier, the XGBoost model supports that parallel training is performed on samples at a granularity of features. For example, one or more threads are allocated to samples having a same feature, and a multi-threaded processor is used to perform training in a hardware implementation. In this way, samples having different (classes) features may be used in parallel to train the machine learning model, thereby obviously reducing a training time of the machine learning model, and improving machine learning model training efficiency.

It should be noted that step 103 to step 106 may be performed for multiple times, to determine a new first sample set gt in which a target variable of a sample in the new first sample set is incorrectly predicted, and a new second sample set le in which a target variable of a sample in the new second sample set is correctly predicted. The first weight and the second weight are iteratively updated, the new first sample set gt and the updated second weight of the new first sample set are inputted to the machine learning model, and the machine learning model is trained again. Certainly, iterative training may be performed for multiple times.

Herein, repeated execution of step 103 to step 106 for the $(t+1)^{th}$ time is used as an example. The first sample set including one or more sample whose target variable is incorrectly predicted and that is determined when step 103 is performed for the $t^{th}$ time is gt, and the second sample set including one or more sample whose target variable is correctly predicted is le. Because in step 103 to step 106, samples (the second weight is increased) in the first sample set are already preferentially used to perform iterative training, when step 103 is performed again, a quantity of samples in the re-determined first sample set gt decreases (because target variables of some samples in the original first sample set gt are already correctly predicted).

The sum of the losses of the samples in the first sample set is marked as $$\sum_{gt} \text{loss},$$

and the overall predicted loss $\xi_t$ of the first sample set is shown in formula (20) marked as follows:

$$\xi_t = \text{w\_gt\_phi}_t \sum_{gt} \text{loss.} \tag{20}$$

In some embodiments, equation (20) is suitable at iterations where the first weight of each sample in the first sample set is the same, e.g., at first iteration $w_1=1/m$. In some embodiments, the overall predicted loss can be the sum of all products for samples in the first sample set, each product being a multiplication of the loss of the sample and the first weight of the sample, i.e., $\xi_t = \Sigma_{gt}(\text{loss}*\text{w\_gt\_phi}_t)$.

$\beta_t = \xi_t^2$. The first weight w_gt_phi$_{t+1}$ in the first sample set and the first weight w_le_phi$_{t+1}$ in the second sample set are updated by using the weight update factor $\beta_t$, as shown in formula (21) and formula (22):

$$w\_le\_\text{phi}_{t+1} = w\_le\_\text{phi}_t * \beta_t \tag{21; and}$$

$$w\_gt\_\text{phi}_{t+1} = w\_gt\_\text{phi}_t \tag{22}.$$

Because $\beta_t$ is less than 1, although the first weight of each sample in the first sample set does not change, compared with the first weight in the second sample set, an increasing effect is achieved. Besides, to prevent the value of the first weight from decreasing excessively (while preventing the value of the second weight from increasing excessively), normalization processing is performed on the first weight of each sample in the first sample set and the first weight in the second sample set.

As shown in formula (23), the normalized w_le_phi$_{t+1}$ is indicated as:

$$w\_le\_\text{phi}_{t+1} = \frac{w\_le\_\text{phi}_2 * \beta_t}{\sqrt{(w\_le\_\text{phi}_t * \beta_t)^2 + (w\_gt\_\text{phi}_t)^2}}. \tag{23}$$

As shown in formula (24), the normalized w_gt_phi$_{t+1}$ is indicated as:

$$w\_gt\_phi_{t+1} = \frac{w\_gt\_phi_t}{\sqrt{(w\_le\_phi_t * \beta_t)^2 + (w\_gt\_phi_t)^2}}. \quad (24)$$

Besides, the second weight in the first sample set and the second weight in the second sample set are updated by using a manner shown in formula (25) and formula (26):

$$w\_xgb\_le\_phi_{t+1} = w\_xgb\_le\_phi_t \quad (25); \text{ and}$$

$$w\_xgb\_gt\_phi_{t+1} = w\_xgb\_gt\_phi_t * (1/\beta_t) \quad (26).$$

Because $1/\beta_t$ is greater than 1, the second weight in the first sample set is increased, and the second weight in the first sample set does not change, the second weight of the first sample set is increased.

When a quantity of times the first weight and the second weight in the first sample set are iteratively updated reaches a specified value, or the overall predicted loss of the first sample set is less than a pre-determined value, the machine learning model has performance of precisely predicting a sample whose prediction correctness percentage of a target variable is 50% or a neighborhood (for example, 48% to 52%).

Figure 5:
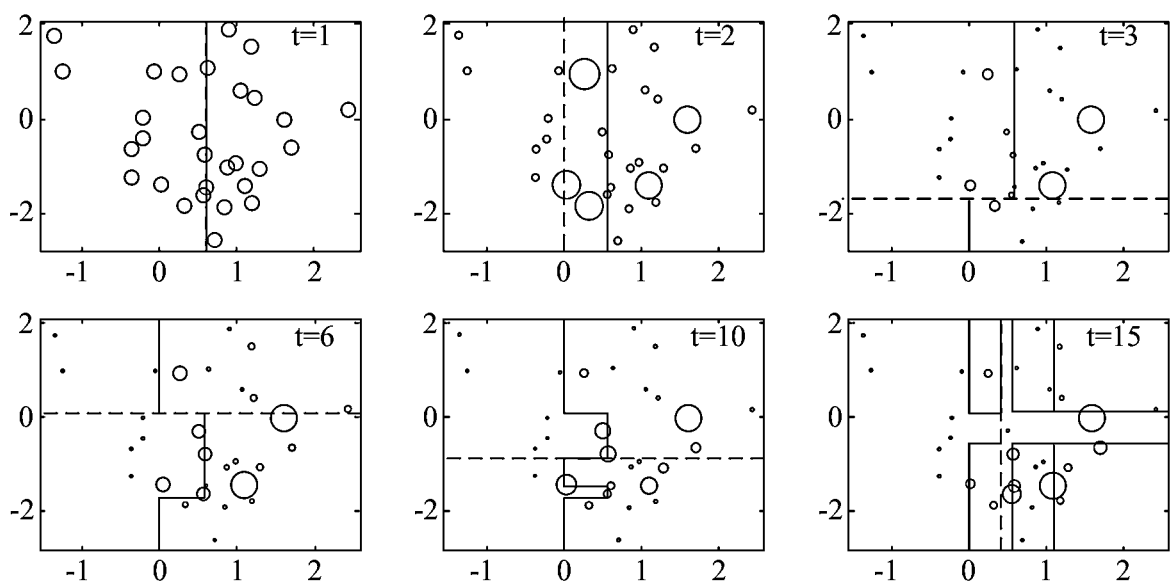
FIG. 5 is an optional schematic diagram of a classification result of samples in a training set in a process of iteratively updating a first weight and a second weight for multiple times according to an embodiment of the present disclosure.

FIG. 5 is an optional schematic diagram of a classification result of samples in a training set in a process of iteratively updating the first weight and the second weight for multiple times (a quantity of times is indicated by t) in an embodiment of the present disclosure. A solid line indicates a model (the model is obtained by iteratively updating the second weight and training samples in previous t times) currently obtained by training, and a dotted line indicates a current machine learning model. In each iterative training, because the second weight in the first sample set is greater than the second weight in the second sample set, the machine learning model preferentially trains the samples in the first sample set. A point in FIG. 5 indicates a sample, and a larger size of the point indicates a higher second weight of the sample. After the first weight and the second weight are iteratively updated for multiple times and the machine learning model is trained, the obtained machine learning model can already distinguish different types of samples.

The embodiments of the present disclosure provide the machine learning model training method and a machine learning model training apparatus. In an actual application, the machine learning model training apparatus may be implemented as various types of terminal devices or implemented as a server, and trains a machine learning model and performs classification according to an actual application requirement, for example, is configured to evaluate whether a user is a user having good credit or a potential to-be-lost user of a client, or the like.

Functional modules of the machine learning model training apparatus may be implemented in coordination by using hardware resources of various types of devices (for example, a terminal device, a server, or a server cluster), such as a computing resource and a communication resource (for example, used to support various manners of communication such as cable and cellular communication) of a processor.

An embodiment of the present disclosure further provides a machine learning model training apparatus, including: a memory, configured to store an executable program; and a processor, configured to perform the machine learning model training method by executing the executable program stored in the memory. The following provides an exemplary description with reference to FIG. 6A.

Figure 6A:
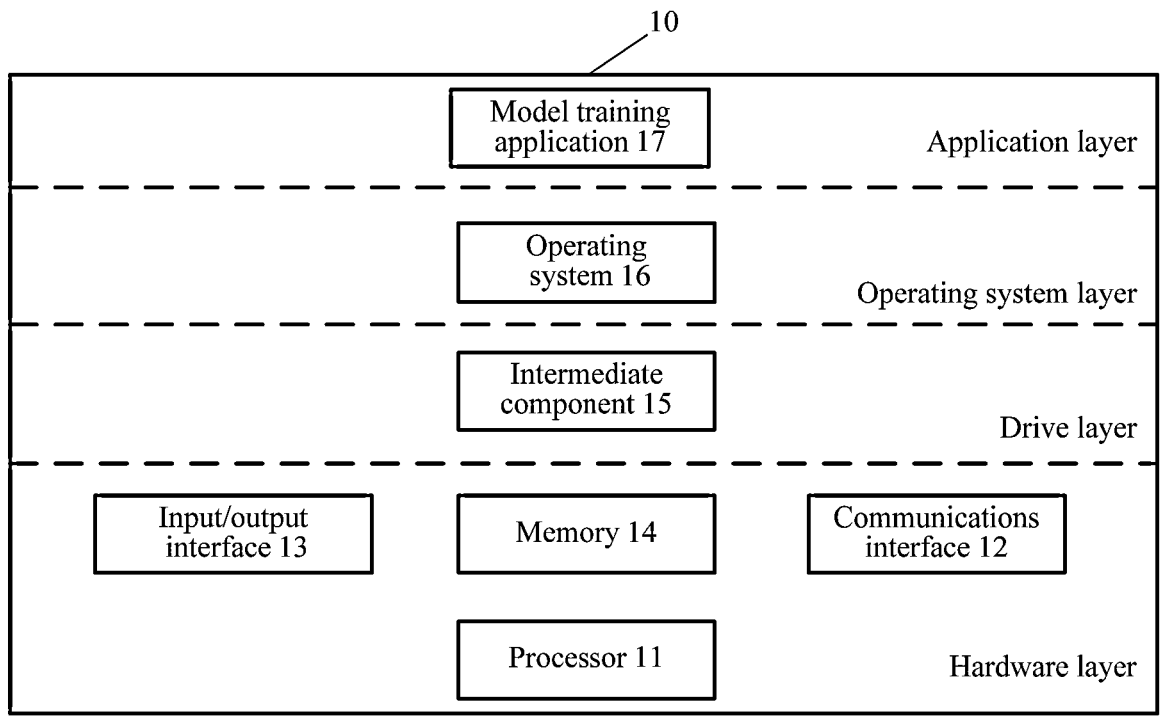
FIG. 6A is an optional schematic structural diagram of software and hardware of a machine learning model training apparatus according to an embodiment of the present disclosure.

FIG. 6A exemplarily shows an optional schematic structural diagram of software and hardware of a machine learning model training apparatus 10. The machine learning model training apparatus 10 includes a hardware layer, an intermediate layer, an operating system layer, and a software layer. However, a person skilled in the art shall understand that the structure of the machine learning model training apparatus 10 shown in FIG. 6A is only an example, and the structure of the machine learning model training apparatus 10 is not limited. For example, the machine learning model training apparatus 10 may be provided with more components than those shown in FIG. 6A according to an implementation requirement, or some components may be omitted according to an implementation requirement.

The hardware layer of the machine learning model training apparatus 10 includes a processor 11, an input/output interface 13, a memory 14, and a communication interface 12. The components may connect to and communicate with each other by using a system bus.

The processor 11 may be implemented by using a CPU, a microprocessor (MCU), an application specific integrated circuit (ASIC), or a logical programmable gate array (FPGA).

The input/output interface 13 may be implemented by using an input/output device, for example, a display screen, a touchscreen, and a speaker.

The memory 14 may be implemented by using a non-volatile memory such as a flash memory, a hard disk, or an optic disk, or may be implemented by using a volatile memory such as a double data rate (DDR) dynamic cache. The non-volatile memory may be a read only memory (ROM) or a programmable read-only memory (PROM), which stores an executable instruction used to perform the machine learning model training method.

In this embodiment of the present disclosure, the memory 14 is configured to store various types of application programs and operating systems to support operations of the machine learning model training apparatus 10.

The machine learning model training method disclosed in the embodiments of the present disclosure may be applied to the processor 11 or performed by the processor 11. The processor 11 may be an integrated circuit chip having signal processing performance. In an implementation process, steps of the foregoing method may be performed by a hardware integrated logic circuit in the processor 11 or an instruction in a form of software. The processor 11 may be a general-purpose processor, a digital signal processor (DSP), other programmable logical devices, a discrete gate or transistor logic device, a discrete hardware component, and the like.

The processor 11 may implement or execute the methods, the steps, and the logical block diagrams provided in the embodiments of the present disclosure. The general-purpose processor may be a microprocessor, any conventional processor, or the like. A software module may be located in a storage medium, the storage medium is located in the memory, and the processor 11 reads information in the memory and performs steps in the foregoing method in combination with hardware thereof.

Exemplarily, the memory 14 and other components of the machine learning model training apparatus 10 may be centrally disposed, or may be disposed in a distributed manner relative to other components of the machine learning model training apparatus 10.

The communication interface 12 provides external data, for example, performance of access to the memory 14 disposed at a different place, to the processor 11. Exemplarily, the communication interface 12 may perform communication in a wired manner (for example, an optical cable and a cable), and is configured to receive a sample for training the machine learning model. Certainly, the communication interface 12 may receive a sample in a short-distance communication manner based on a near field communication (NFC) technology, a Bluetooth technology, and a ZigBee technology. Besides, the communication interface 12 may further receive a sample in a communication manner of a communication standard such as Code Division Multiple Access (CDMA), Wideband Code Division Multiple Access (WCDMA), and an evolved standard thereof.

The drive layer includes an intermediate component 15 configured to enable an operating system 16 to identify the hardware layer and communicate with each component of the hardware layer, for example, may be a set of drive programs for each component of the hardware layer.

The operating system 16 is configured to provide a graphical user interface, for example, includes a plug-in icon, a desktop background, and an application icon. The operating system 16 supports a user to control a device by using the graphical interface. In this embodiment of the present disclosure, a software environment of the device such as an operating system type or version is not limited. For example, the operating system 16 may be an operating system Linux, an operating system UNIX, or another operating system.

The application layer includes an application run by a terminal on a user side. For example, a model training application 17 runs on the application layer, to perform the machine learning model training method provided in the embodiments of the present disclosure.

Figure 6B:
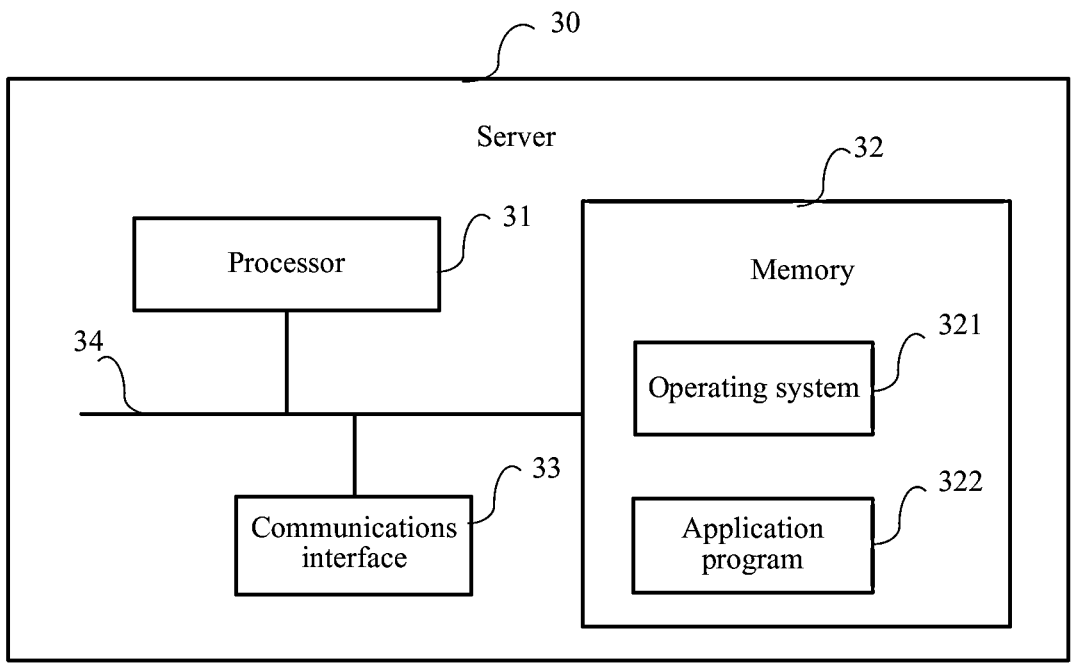
FIG. 6B is an optional schematic structural diagram of hardware of a server according to an embodiment of the present disclosure.

An embodiment of the present disclosure further provides a server, exemplarily shown in FIG. 6B. The server 30 shown in FIG. 6B includes: a processor 31, a memory 32, and a communication interface 33. The components of the server 30 are coupled by using a bus system 34. It should be understood that the communications bus 34 is configured to implement connection and communication between the components. The bus system 34 further includes a power supply bus, a control bus, and a status signal bus in addition to a data bus. However, for the purpose of description clarity, various buses are all marked as a first bus system 34 in FIG. 6B.

The components shown in FIG. 6B are only an example, do not indicate a quantity, may be disposed in a distributed manner in physical locations, and are connected by using the bus system 34 (for example, which may be a cable or an optical fiber) to become a whole logically. In this case, the bus system 34 may implement, by using the communication interface 33, communication between application programs 322 (for example, databases) disposed in a distributed manner.

It may be understood that the memory 32 may be a volatile memory or a non-volatile memory, and may also include both a volatile memory and a non-volatile memory. The non-volatile memory may be a ROM or a PROM. The memory 32 in this embodiment of the present disclosure intends to include but is not limited to these and any other proper memories.

In this embodiment of the present disclosure, the memory 32 is configured to store various types of application programs 322 and operating systems 321 to support operations of the machine learning model training apparatus 30.

The machine learning model training method disclosed in the embodiments of the present disclosure may be applied to the processor 31 or performed by the processor 31. The processor 31 may be an integrated circuit chip having a signal processing capability. In an implementation process, steps of the foregoing method may be performed by a hardware integrated logic circuit in the processor 31 or an instruction in a form of software. The processor 31 may be a general-purpose processor, a DSP, other programmable logical devices, a discrete gate or transistor logic device, a discrete hardware component, and the like.

The processor 31 may implement or execute the methods, the steps, and the logical block diagrams provided in the embodiments of the present disclosure. The general-purpose processor may be a microprocessor, any conventional processor, or the like. A software module may be located in a storage medium, the storage medium is located in the memory 32, and the processor 31 reads information in the memory 32 and performs steps in the foregoing method in combination with hardware thereof.

Certainly, the embodiments of the present disclosure are not limited to be provided as methods and hardware, and there may be further multiple implementations, for example, provided as a storage medium (storing a program configured to perform the machine learning model training method provided in the embodiments of the present disclosure). When the program is run by the processor, the following operations are performed:

training a machine learning model using features of each sample in a training set based on an initial first weight of each sample and an initial second weight of each sample;

in one iteration of training the machine learning model, (e.g., after the machine learning model is trained at the beginning of the current iteration), determining a first sample set including one or more sample whose corresponding target variable is incorrectly predicted, and a second sample set including one or more sample whose corresponding target variable is correctly predicted, based on a predicted loss of each sample in the training set;

determining an overall predicted loss of the first sample set based on a predicted loss and the corresponding first weight of each sample in the first sample set; and updating a first weight and a second weight of each sample in the first sample set based on the overall predicted loss of the first sample set (e.g., at the first iteration, the first weight and the second weight of a sample are the initial first weight and the initial second weight of the sample; at an iteration other than the first iteration (e.g., Tth iteration), the first weight and the second weight are the first weight and the second weight obtained/updated from previous iteration (e.g., T−1th iteration); and inputting the updated second weight of each sample in the training set, and the features and the target variable of each sample in the training set to the machine learning model, and initiating a next iteration of training the machine learning model.

When the program is run by the processor, the following operation is performed:

initializing the first weight and the second weight of each sample in the training set to obtain the initial first weight of each sample and the initial second weight of each sample; inputting the second weight of each sample in the training set, the features of each sample in the training set, and the target variable of each sample in the training set to the machine learning model; and correspondingly allocating a thread to samples having a same feature in the machine learning model, and training the machine learning model using parallel threads.

When the program is run by the processor, the following operations are performed:

uniformly allocating the initial first weight to each sample in the training set, and uniformly allocating the initial second weight different from the initial first weight to each sample in the training set based on a quantity of samples in the training set.

When the program is run by the processor, the following operations are further performed:

after training the machine learning model at one iteration, determining a compensation function that causes the predicted loss to converge based on a gradient direction, according to a gradient direction of a loss function of the machine learning model; and superimposing, on the machine learning model, the compensation function to compensate for the predicted loss.

When the program is run by the processor, the following operations are further performed:

based on a difference between a predicted value of the target variable and an actual value of the target variable of a sample in the first sample set in the machine learning model, determining that that the predicted loss of the sample in the first sample set is an output value of a loss function that uses the difference as a dependent variable.

When the program is run by the processor, the following operations are performed:

in the training set, determining the first sample set whose predicted loss exceeds a loss threshold, and the second sample set whose predicted loss does not exceed the loss threshold.

When the program is run by the processor, the following operations are performed:

constructing a weight update factor by using a product of the overall predicted loss of the first sample set and the first weight; and decreasing the first weight of each sample in the second sample set, and increasing the second weight of each sample in the first sample set based on the weight update factor.

When the program is run by the processor, the following operations are further performed:

performing normalization processing on the first weight of each sample in the training set to obtain a normalization processing result, and updating the first weight of each sample in the training set based on the normalization processing result.

When the program is run by the processor, the following operations are further performed:

determining a fusion coefficient of a classifier included in the machine learning model, by minimizing a quadratic sum of predicted losses of the samples in the first sample set; and combining classifiers to form the trained machine learning model, based on fusion coefficients of the classifiers.

When the program is run by the processor, the following operations are further performed:

updating the first sample set and the second sample set, and iteratively updating the first weight and the second weight of the first sample set; and training the machine learning model based on the updated first sample set and the updated second weight, until a quantity of iterations (e.g., iterative update times) is satisfied, or the overall predicted loss of the first sample set is less than a pre-determined value.

Figure 7:
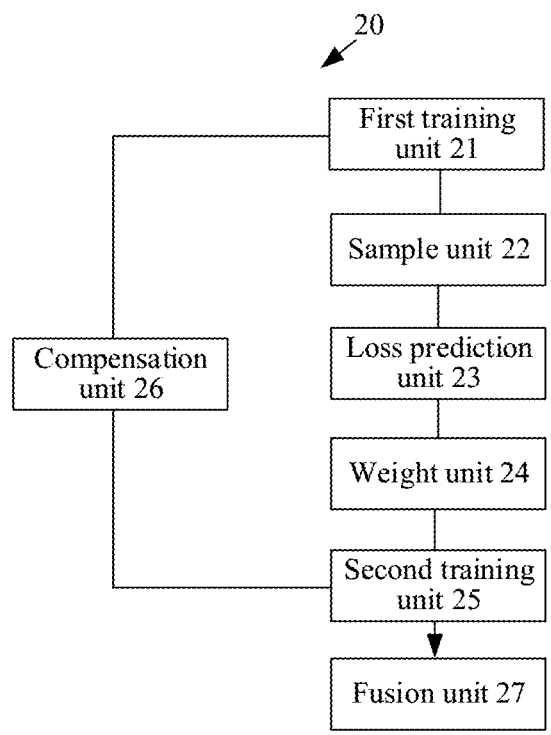
FIG. 7 is an optional schematic structural functional diagram of a machine learning model training apparatus according to an embodiment of the present disclosure.

A functional structure of the machine learning model training apparatus is further described. Refer to an optional schematic structural functional diagram of the machine learning model training apparatus 20 shown in FIG. 7, including:

a first training unit 21, configured to train a machine learning model at a granularity of a feature of each sample in a training set based on an initial first weight and an initial second weight of each sample;

a sample unit 22, configured to determine a first sample set in which a corresponding target variable is incorrectly predicted, and a second sample set in which a corresponding target variable is correctly predicted, based on a predicted loss of each sample in the training set;

a loss prediction unit 23, configured to determine an overall predicted loss of the first sample set based on a predicted loss of each sample in the first sample set and the corresponding first weight;

a weight unit 24, configured to increase a first weight and a second weight of each sample in the first sample set based on the overall predicted loss of the first sample set; and a second training unit 25, configured to: input the updated second weight of each sample in the training set, and the feature and the target variable of each sample to the machine learning model, and train the machine learning model at the granularity of the feature of each sample.

In an embodiment, the first training unit 21 is further configured to: initialize the first weight and the second weight of each sample in the training set; input the second weight of each sample and the feature and the target variable of each sample in the training set to the machine learning model; and correspondingly allocate a thread to samples having a same feature in the machine learning model, and perform training in a parallel thread manner.

In an embodiment, the first training unit 21 is further configured to: uniformly allocate the first weight to each sample in the training set, and uniformly allocate the second weight different from the first weight to each sample in the training set based on a quantity of samples in the training set.

In an embodiment, the machine learning model training apparatus 20 further includes: a compensation unit 26, configured to: after the first training unit 21 and the second training unit 25 train the machine learning model each time, determine a compensation function that causes the predicted loss to converge based on a gradient direction of a loss function of the machine learning model, based on the gradient direction; and superimpose, on the machine learning model, the compensation function used to compensate for the predicted loss.

In an embodiment, the loss prediction unit 23 is further configured to: based on a difference between a predicted value and an actual value of each sample in the first sample set in the machine learning model, determine that an output value of a loss function that uses the difference as a dependent variable is a predicted loss of a corresponding sample.

In an embodiment, the sample unit 22 is further configured to determine, in the training set, the first sample set in which the predicted loss exceeds the loss threshold, and the second sample set in which the predicted loss does not exceed the loss threshold.

In an embodiment, the sample unit 22 is further configured to: construct a weight update factor by using a product of the overall predicted loss of the first sample set and the first weight; and decrease the first weight of each sample in the second sample set, and increase the second weight of each sample in the first sample set based on the weight update factor.

In an embodiment, the weight unit 24 is further configured to: perform normalization processing on the first weight of each sample in the training set, and correspondingly update the first weight of each sample based on a normalization processing result.

In an embodiment, the machine learning model training apparatus 20 further includes:

a fusion unit 27, configured to: determine a fusion coefficient of a classifier included in the machine learning model, by minimizing a quadratic sum of predicted losses of the samples in the first sample set; and combine classifiers to form the trained machine learning model, based on fusion coefficients of the classifiers.

In an embodiment, the second training unit 25 is further configured to: train the machine learning model based on the first sample set and the second sample set that are iteratively updated by the sample unit, and the second weight of the first sample set that is iteratively updated by the weight unit, until a quantity of iterative update times is satisfied, or the overall predicted loss of the first sample set is less than a predetermined value.

The following further exemplarily describes different implementations of the machine learning model training apparatus.

1. Application Program and Module at a Mobile End

Figure 8A:
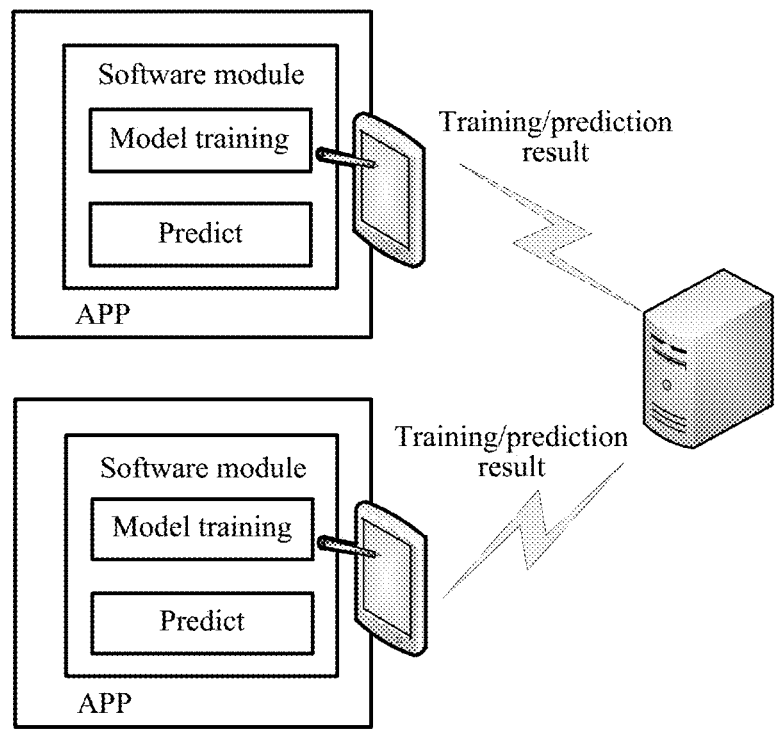
FIG. 8A is an optional schematic diagram of implementing a learning model training apparatus on various mobile sides according to an embodiment of the present disclosure.

FIG. 8A is an optional schematic diagram in which a software module that may be designed by using a programming language such as C/C++ or Java is embedded into various mobile end APPs (for example, Wechat) based on a system such as Android or iOS (stored in a storage medium of the mobile end as an executable instruction, and is executed by a processor of the mobile end) according to an embodiment of the present disclosure. Related tasks such as machine learning model training and prediction are completed by using a computing resource of the mobile end, and results of the machine learning model training, prediction, and the like are periodically or aperiodically transferred to a remote server in various network communication manners or locally stored at the mobile end.

For example, an APP at the mobile end may complete machine learning model training based on related sample data collected from the mobile end, and predict whether an APP user is a potential user to be lost. A background server of the APP pushes a free service to the user to avoid a user loss with reference to a customer care policy according to a predicted result reported by the APP.

2. Application Program and Platform of a Server

Figure 8B:
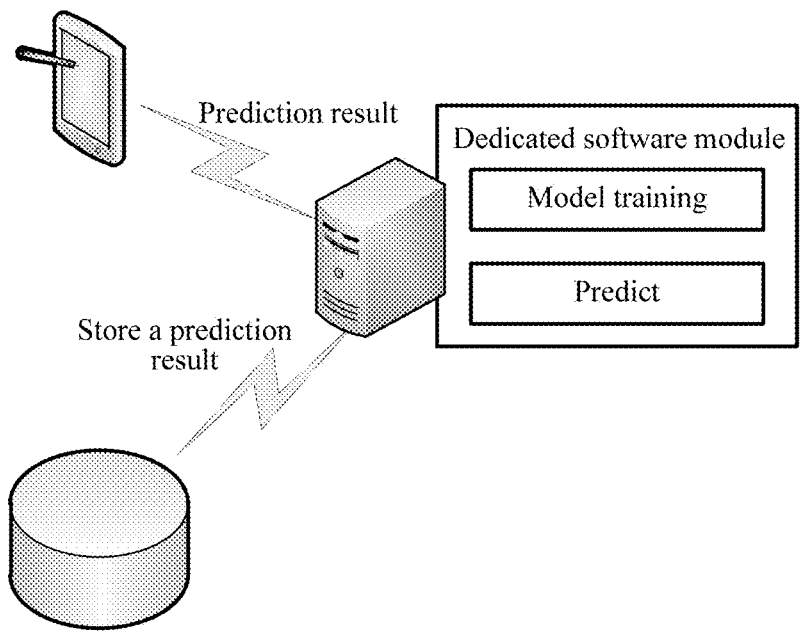
FIG. 8B is an optional schematic diagram of implementing a learning model training apparatus in a server according to an embodiment of the present disclosure.

FIG. 8B is an optional schematic diagram in which a dedicated software module in application software or a large software system designed by using a programming language such as C/C++ and Java runs at a server end (stored in a storage medium of the server end as an executable instruction, and run by a processor of the server end) according to an embodiment of the present disclosure. At least one of various original data, various levels of intermediate data, and a final result received from another device, and existing data or results on the server are combined to perform machine learning model training. The trained machine learning model is used to perform prediction. The machine learning model or a predicted result is outputted, in real time or not in real time, to another application program or module for usage, or may be written to a database or a file at the server end for storage.

The embodiments of the present disclosure may be further provided as customized web interfaces or other user interfaces (UI) that are easy for interaction and that are attached on a distributed parallel computing platform including multiple servers, to form a data extraction platform for usage by an individual, a group, or an enterprise, a credit evaluation platform (used to evaluate whether a customer is a high-quality customer), a user loss warning platform (used to identify a potential customer to be lost), and the like. A user may upload existing data packets to the platform in batches, to obtain various computing results, or transmit real-time data streams to the platform to compute and update various levels of results in real time.

3. Application Program Interface (API) and Plug-In at a Server End

Figure 8C:
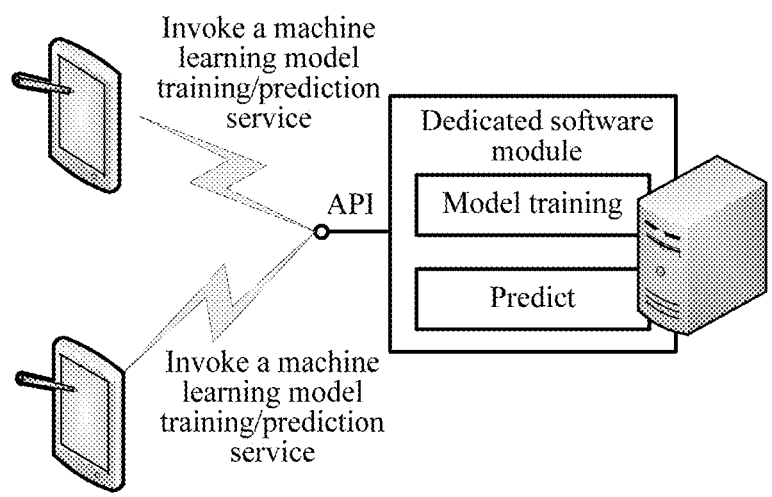
FIG. 8C is an optional schematic diagram of implementing a learning model training apparatus on various mobile sides according to an embodiment of the present disclosure.

FIG. 8C is an optional schematic diagram of an API, a software development toolkit (SDK), or a plug-in that implements a machine learning model training function, and performs prediction based on a machine learning model at a server end according to an embodiment of the present disclosure. The API, the SDK, or the plug-in are invoked by application program developers at other server ends, and embedded into various application programs.

4. API and Plug-In on a Mobile Device Client

Figure 8D:
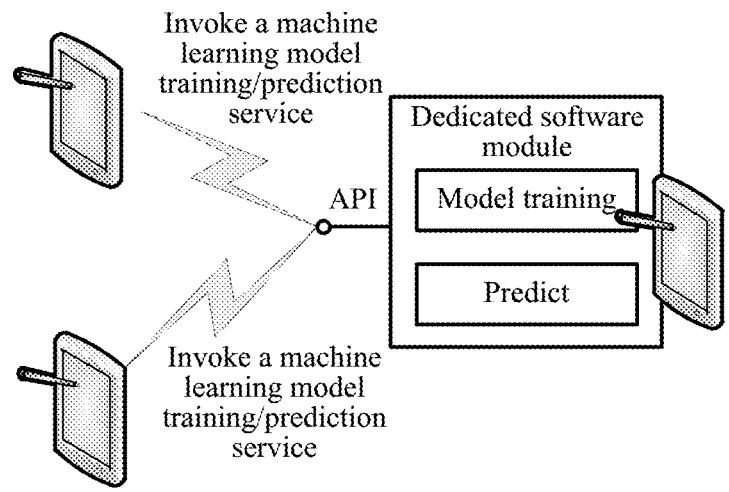
FIG. 8D is an optional schematic diagram of implementing a learning model training apparatus on various mobile sides according to an embodiment of the present disclosure.

FIG. 8D is an optional schematic diagram of an API, an SDK, or a plug-in that implements a machine learning model training function, and performs prediction based on a machine learning model at a mobile device end according to an embodiment of the present disclosure. The API, the SDK, or the plug-in are invoked by application program developers at other mobile ends, and embedded into various application programs.

5. Cloud Open Service

Figure 8E:
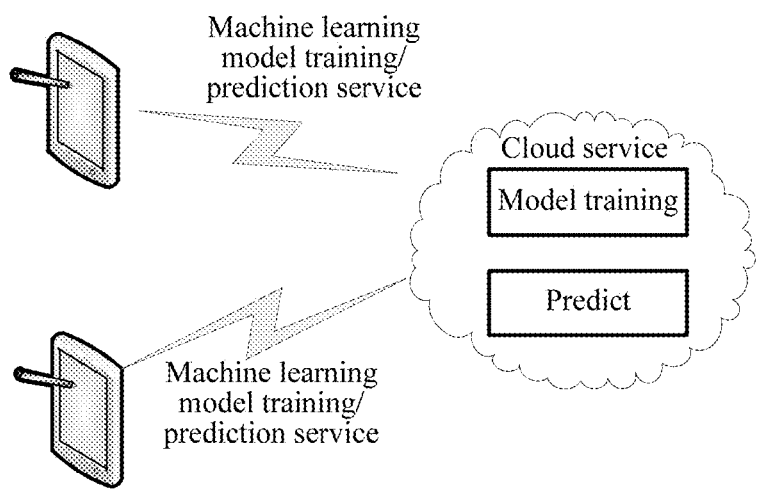
FIG. 8E is an optional schematic diagram of implementing a learning model training apparatus on various cloud sides according to an embodiment of the present disclosure.

FIG. 8E is an optional schematic diagram of a cloud service in which prediction is performed based on a machine learning model according to an embodiment of the present disclosure. The cloud service includes a credit evaluation cloud service and a user loss warning cloud service. The embodiments of the present disclosure may be further provided as an API, an SDK, a plug-in, and the like of a credit evaluation cloud service and a user loss warning cloud service, and packaged as a cloud service that can be openly used by persons inside and outside an enterprise. Alternatively, various results are displayed on various terminal display devices in a proper form, for query by an individual, a group, an enterprise, or an institution.

An example of an application scenario to which the machine learning model provided in the embodiments of the present disclosure can be applied is used for description. Certainly, a scenario example provided below constitutes no limitation.

Scenario 1) The machine learning model is implemented as a binary classification warning model: Features including more than 1400 dimensions are constructed in the machine learning model based on basic types of features of a moral risk, income performance, a strained money chain, a game preference, malicious usage, and the like. On this basis, whether a user is a high-quality customer is predicted by using the binary classification warning model, to provide data support for further improving risk control performance of banks for credit users and formulating an effective policy.

First. Prepare Sample Data, and Construct a Training Set

Based on main types of features of samples such as a moral risk, income performance, a strained money chain, a game preference, malicious usage, and the like, the main types of features are further classified to subtypes of communication (6), special number (11), label (29), account information consistency (20), location-based service (56), device (39), message (28), communication time segment (42), game (142), shared friend (76), login behavior (172), adding a friend (384), and payment (432) in 13 dimensions (a number in the bracket indicates a quantity of features that may be used for modeling in each subtype, some features are primitive feature indexes, and some features are feature indexes derived from primitive indexes).

Features of multiple samples in the foregoing dimensions, and the target variable (that is, a grade or a confidence level of a sample that is a high-quality customer) form the training set.

Second. Weight Allocation of a Sample

The prior first weight and the prior second weight are uniformly allocated to each sample in the training set, values of the first weights $w_1$ of the samples are the same, and values of the second weights $w\_xgb_1$ of the samples are the same.

Third. Iterative Training Stage

The second weight of each sample in the training set, and the feature and the target variable (that is, a grade or a confidence level of a sample that is a high-quality customer) of each sample are inputted to a binary classification warning model for training.

Assuming that a binary classification warning model uses the linear system model shown in formula (2), that is, classifiers in the binary classification warning model are combined based on a fusion coefficient, each iterative training process of the binary classification warning model is a process of adjusting the fusion coefficient according to a relationship between the feature and the target variable of the sample.

After each iterative training of the binary classification warning model, the predicted loss of each sample in the training set is determined based on the loss function of the binary classification warning model, and the first sample set gt in which the target variable is incorrectly predicted and the second sample set le in which the target variable is correctly predicted are determined according to the predicted loss.

The predicted loss of each sample in the first sample set is calculated according to formula (14), the overall predicted loss of the first sample set gt is determined based on formula (15) with reference to the first weight of the sample, and the first weight and the second weight of each sample in the first sample set are increased according to the overall predicted loss by using formulas (16) and (17) or formulas (18) and (19).

Assuming that the binary classification warning model includes multiple classifiers marked as $y_1(x)$ to $y_m(x)$, the first sample set of the training set and the second weight thereof, and the second sample set and the second weight thereof are inputted into each classifier in the binary classification warning model, a fusion coefficient $\alpha_m$ of each classifier is solved by minimizing a weight error function of the classifier, and classifiers are combined based on formula (2) and the fusion coefficient $\alpha_m$ of each classifier, to obtain a new binary classification warning model after iterative training.

Iterative training ends after reaching a preset quantity of iterative training times. Alternatively, the target function shown in formula (4) and (5) is constructed for the binary classification warning model. Based on whether a value of the target function is less than a pre-determined value, it is determined whether an ideal fusion coefficient is obtained after each iterative training. When the value is not less than the pre-determined value, iterative training continues. When the value is less than the pre-determined value, the fusion coefficient is outputted, and the classifiers are combined according to the fusion coefficient, to obtain the trained binary classification warning model.

When the machine learning model uses an XGBoost model as a classifier, the XGBoost model supports that parallel training is performed on samples at a granularity of features. For example, one or more threads are allocated to samples having a same feature, and a multi-threaded processor is used to perform training in a hardware implementation. In this way, samples having different (classes) features may be used in parallel to train the machine learning model, thereby obviously reducing a training time of the machine learning model, and improving machine learning model training efficiency.

Feature data of a to-be-predicted user is collected, and a grade (or a confidence level) of a high-quality customer is predicted according to the trained binary classification warning model. When the grade exceeds a grade threshold (or a confidence level threshold), it is determined that the user is a high-quality customer.

Scenario 2) The machine learning model is implemented as a user loss warning model: Behavior data of known users (including a user lost and a user not lost) is analyzed in the user loss warning model based on features such as a basic user attribute, activeness, login states, and message states. Behavior data prediction and modeling are performed by using the present disclosure, a potential user to be lost is accurately predicted, and advertizing activities are performed for a user that may be lost, thereby improving overall user activeness.

First. Prepare Sample Data, and Construct a Training Set

The training set is formed based on features of multiple samples in different dimensions (basic user attributes, activeness, login states, message states, and the like), and the target variable (that is, a grade or a confidence level of a sample that is a lost user).

Second. Weight Allocation of a Sample

The prior first weight and the prior second weight are uniformly allocated to each sample in the training set, values of the first weights $w_1$ of the samples are the same, and values of the second weights $w\_xgb_1$ of the samples are the same.

Third. Iterative Training Stage

The second weight of each sample in the training set, and the feature and the target variable of each sample (that is, a grade or a confidence level of a sample that is a high-quality customer) are inputted to a user loss warning model for training.

Assuming that a user loss warning model uses the linear system model shown in formula (2), that is, classifiers in the user loss warning model are combined based on a fusion system, each iterative training process of the user loss warning model is a process of adjusting the fusion coefficient according to a relationship between the feature and the target variable of the sample.

After each iterative training of the user loss warning model, the predicted loss of each sample in the training set is determined based on the loss function of the user loss warning model, and the first sample set gt in which the target variable is incorrectly predicted and the second sample set le in which the target variable is correctly predicted are determined according to the predicted loss.

The predicted loss of each sample in the first sample set is calculated according to formula (14), the overall predicted loss of the first sample set gt is determined based on formula (15) with reference to the first weight of the sample, and the first weight and the second weight of each sample in the first sample set are increased according to the overall predicted loss by using formulas (16) and (17) or formulas (18) and (19).

Assuming that the user loss warning model includes multiple classifiers marked as $y_1(x)$ to $y_m(x)$, the first sample set of the training set and the second weight thereof, and the second sample set and the second weight thereof are inputted into each classifier in the user loss warning model, a fusion coefficient $\alpha_m$ of each classifier is solved by minimizing a weight error function of the classifier, and classifiers are combined based on formula (2) and the fusion coefficient $\alpha_m$ of each classifier, to obtain a new user loss warning model after iterative training.

Iterative training ends after reaching a preset quantity of iterative training times. Alternatively, the target function shown in formula (4) and (5) is constructed for the user loss warning model. Based on whether a value of the target function is less than a pre-determined value, it is determined whether an ideal fusion coefficient is obtained after each iterative training. When the value is not less than the pre-determined value, iterative training continues. When the value is less than the pre-determined value, the fusion coefficient is outputted, and the classifiers are combined according to the fusion coefficient, to obtain the trained user loss warning model.

When the machine learning model uses an XGBoost model as a classifier, the XGBoost model supports that parallel training is performed on samples at a granularity of features. For example, one or more threads are allocated to samples having a same feature, and a multi-threaded processor is used to perform training in a hardware implementation. In this way, samples having different (classes) features may be used in parallel to train the machine learning model, thereby obviously reducing a training time of the machine learning model, and improving machine learning model training efficiency.

Feature data of a to-be-predicted user is collected, and a grade (or a confidence level) of a lost customer is predicted according to the trained user loss warning model. When the grade exceeds a grade threshold (or a confidence level threshold), it is determined that the user is a potential customer to be lost.

The embodiments of the present disclosure have the following beneficial effects:
1) The machine learning model is trained when samples are distributed based on the prior second weight, a sample (the first sample set) that is incorrectly predicted by the machine learning model is found, and a corresponding weight is increased. In this way, by using updated distribution of samples, in subsequent training, a classifier in the machine learning model pays more attention to the sample that is incorrectly predicted, and prediction precision of the incorrect sample is improved.
2) The machine learning model is trained in parallel at the granularity of the feature, a training process can be quickly completed by a multithreaded processor easily, and training efficiency of the machine learning model is improved.
3) To resolve a problem that the fusion coefficient of the machine learning model is not optimal, the optimal fusion coefficient of the classifier is solved by using the quadratic sum of the predicted losses of the samples, to ensure precision of the trained machine learning model.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A machine learning model training method, implemented by a computing device, comprising:
training a machine learning model using features of samples in a training set, wherein a sample in the training set corresponds to an initial first weight and an initial second weight;
in one iteration of training the machine learning model:
determining a first sample set comprising one or more samples whose corresponding target variables are incorrectly predicted based on predicted losses of the samples in the training set;
determining an overall predicted loss of the first sample set based on the predicted losses and corresponding first weights of the one or more samples in the first sample set;
updating the first weights and second weights of the one or more samples in the first sample set based on the overall predicted loss of the first sample set; and
inputting the second weights, the features, and the target variables of the samples in the training set to the machine learning model, and initiating a next iteration of training the machine learning model.

2. The method according to claim 1, further comprising:
for one sample in the training set, initializing a first weight and a second weight of the sample in the training set to obtain the initial first weight and the initial second weight;
inputting, to the machine learning model, the second weights, the features, and the target variables of the samples in the training set; and
allocating a thread to samples having a same feature in the machine learning model, and training the machine learning model using parallel threads.

3. The method according to claim 2, wherein the initializing the first weight and the second weight of the sample in the training set comprises:
uniformly allocating the initial first weight to a plurality of samples in the training set, and uniformly allocating the initial second weight to the plurality of samples in the training set based on a quantity of samples in the training set, wherein the initial second weight is different from the initial first weight.

4. The method according to claim 1, further comprising:
after training the machine learning model in one iteration, determining, according to a gradient direction of a loss function of the machine learning model, a compensation function that causes the predicted loss to converge based on the gradient direction; and
superimposing, on the machine learning model, the compensation function to compensate for the predicted loss.

5. The method according to claim 1, further comprising:
based on a difference between a predicted value of the target variable and an actual value of the target variable of a sample in the first sample set, determining that the predicted loss of the sample in the first sample set is an output value of a loss function that uses the difference as a dependent variable.

6. The method according to claim 1, wherein the determining a first sample set comprising a sample whose corresponding target variable is incorrectly predicted based on predicted losses of the samples in the training set comprises:
in the training set, determining that a sample whose predicted loss exceed a loss threshold belongs to the first sample set, and determining that a sample whose predicted loss does not exceed the loss threshold is a sample whose corresponding target variable is correctly predicted and belongs to a second sample set.

7. The method according to claim 1, wherein further comprising: for one sample,
constructing a weight update factor based on the overall predicted loss of the first sample set and the first weight of the sample; and
decreasing the first weight of the sample when the sample has a correctly predicted target variable based on the weight update factor, and increasing the second weight of the sample based on the weight update factor when the sample belongs to the first sample set.

8. The method according to claim 7, further comprising:
performing normalization processing on the first weights of the samples in the training set to obtain a normalization processing result, and updating the first weights of the samples in the training set based on the normalization processing result.

9. The method according to claim 1, further comprising:
determining a fusion coefficient of a classifier comprised in the machine learning model, by minimizing a quadratic sum of predicted losses of samples in the first sample set; and
combining classifiers to form the trained machine learning model, based on fusion coefficients of the classifiers.

10. The method according to claim 1, further comprising:
iteratively updating the first sample set, and iteratively updating the first weights and the second weights of the one or more samples of the first sample set; and
training the machine learning model based on the updated first sample set, until a quantity of iterations is satisfied, or the overall predicted loss of the first sample set is less than a pre-determined value.

11. A machine learning model training apparatus, comprising:
a memory; and
one or more processors configured to:
train a machine learning model using features of samples in a training set, wherein a sample in the training set corresponds to an initial first weight and an initial second weight;
in one iteration of training the machine learning model,
determine a first sample set comprising one or more samples whose corresponding target variables are incorrectly predicted based on predicted losses of the samples in the training set;
determine an overall predicted loss of the first sample set based on the predicted losses and corresponding first weights of the one or more samples in the first sample set;
update the first weights and second weights of the one or more samples in the first sample set based on the overall predicted loss of the first sample set; and
input the second weights, the features, and the target variables of the samples in the training set to the machine learning model, and initiate a next iteration of training the machine learning model.

12. The apparatus according to claim 11, wherein the one or more processors are further configured to:
for one sample in the training set, initializing a first weight and a second weight of the sample in the training set to obtain the initial first weight and the initial second weight;
input the second weights, the features, and the target variables of the samples in the training set to the machine learning model; and
allocate a thread to samples having a same feature in the machine learning model, and train the machine learning model using parallel threads.

13. The apparatus according to claim 12, wherein the one or more processors are further configured to:
uniformly allocate the initial first weight to a plurality of samples in the training set, and uniformly allocate the initial second weight to the plurality of samples in the training set based on a quantity of samples in the training set, wherein the initial second weight is different from the initial first weight.

14. The apparatus according to claim 11, wherein the one or more processors are further configured to:
in one iteration when the machine learning model is trained,
determine, according to a gradient direction of a loss function of the machine learning model, a compensation function that causes the predicted loss to converge based on the gradient direction; and
superimpose, on the machine learning model, the compensation function to compensate for the predicted loss.

15. The apparatus according to claim 11, wherein the one or more processors are further configured to:
based on a difference between a predicted value of the target variable and an actual value of the target variable of a sample in the first sample set, determine that a predicted loss of the sample is an output value of a loss function that uses the difference as a dependent variable.

16. The apparatus according to claim 11, wherein the one or more processors are further configured to:
in the training set, determine that a sample whose predicted loss exceed a loss threshold belongs to the first sample set, and determine that a sample whose predicted loss does not exceed the loss threshold is a sample whose corresponding target variable is correctly predicted and belongs to a second sample set.

17. The apparatus according to claim 11, wherein the one or more processors are further configured to:
construct a weight update factor based on the overall predicted loss of the first sample set and the first weight of the sample; and
decrease the first weight of the sample when the sample has a correctly predicted target variable based on the weight update factor, and increasing the second weight of the sample based on the weight update factor when the sample belongs to the first sample set.

18. The apparatus according to claim 11, wherein the one or more processors are further configured to:
determine a fusion coefficient of a classifier comprised in the machine learning model, by minimizing a quadratic sum of predicted losses of the samples in the first sample set; and
combine classifiers to form the trained machine learning model, based on fusion coefficients of the classifiers.

19. The apparatus according to claim 11, wherein the one or more processors are further configured to:
update the first sample set, and update the first weights and the second weights of the one or more samples in the first sample set, train the machine learning model based on the updated first sample set, until a quantity of iterations is satisfied, or the overall predicted loss of the first sample set is less than a pre-determined value.

20. A non-transitory storage medium, storing an executable program, when being executed by a processor, the executable program causes the processor to perform:
- training a machine learning model using features of samples in a training set, wherein a sample in the training set corresponds to an initial first weight and an initial second weight;
- in one iteration of training the machine learning model:
  - determining a first sample set comprising one or more samples whose corresponding target variables are incorrectly predicted based on predicted losses of the samples in the training set;
  - determining an overall predicted loss of the first sample set based on the predicted losses and corresponding first weights of the one or more samples in the first sample set;
  - updating the first weights and second weights of the one or more samples in the first sample set based on the overall predicted loss of the first sample set; and
  - inputting the second weights, the features, and the target variables of the samples in the training set to the machine learning model, and initiating a next iteration of training the machine learning model.

\* \* \* \* \*